US012806594B2

(12) United States Patent
Maier et al.

(10) Patent No.: US 12,806,594 B2
(45) Date of Patent: Nov. 24, 2026

(54) SUPERSONIC DIFFUSER FOR TURBOMACHINERY ARRANGED TO IMPART THERMAL ENERGY TO A PROCESS FLUID

(71) Applicant: Siemens Energy Global GmbH & Co. KG, Munich (DE)

(72) Inventors: William C. Maier, Almond, NY (US); Ravichandra Srinivasan, Renton, WA (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 155 days.

(21) Appl. No.: 18/998,185

(22) PCT Filed: Jul. 27, 2022

(86) PCT No.: PCT/US2022/038437

§ 371 (c)(1),
(2) Date: Jan. 24, 2025

(87) PCT Pub. No.: WO2024/025520

PCT Pub. Date: Feb. 1, 2024

(65) Prior Publication Data

US 2026/0027543 A1 Jan. 29, 2026

(51) Int. Cl.

*B01J 19/10* (2006.01)
*F04D 21/00* (2006.01)
*F04D 29/54* (2006.01)

(52) U.S. Cl.

CPC .............. *B01J 19/10* (2013.01); *F04D 21/00* (2013.01); *F04D 29/542* (2013.01); *B01J 2219/0869* (2013.01)

(58) Field of Classification Search

CPC .......... B01J 19/10; F04D 21/00; F04D 29/542
See application file for complete search history.

(56) References Cited

U.S. PATENT DOCUMENTS

| | | | |
|---|---|---|---|
| 3,719,426 | A | 3/1973 | Friberg et al. |
| 5,447,413 | A | 9/1995 | Maier et al. |

(Continued)

FOREIGN PATENT DOCUMENTS

| | | | |
|---|---|---|---|
| JP | S5133309 | A | 3/1976 |
| WO | 2020060919 | A1 | 3/2020 |

OTHER PUBLICATIONS

Ridings, Andrew N., Smart, Michael K., Flow Establishment of Precombustion Shock Trains in a Shock Tunnel, University of Queensland, Brisbane, Queensland 4072, Australia, DOI: 10.2514/1.J055590, May 2, 2017.

(Continued)

*Primary Examiner* — Sean E Conley
(74) *Attorney, Agent, or Firm* — Enrique J. Mora

(57) ABSTRACT

A supersonic diffuser for use in turbomachinery adapted to impart thermal energy to a process fluid is provided. The diffuser includes a vaned zone configured to define a passageway having a flow area to pass a flow of a process fluid at supersonic velocity. The vaned zone is configured to define a step-change to the flow area of the passageway at a given location, such as where the flow of the process fluid exits the vaned zone. The diffuser further includes a shock zone coupled to the vaned zone to pass the flow of the process fluid that exits the vaned zone. The shock zone is configured to support a system of shock waves that increases static temperature of the process fluid downstream of the system of shock waves. A mixing and subsonic diffusion is configured to decelerate process fluid from the shock zone to a reduced subsonic speed prior to discharge of the process fluid through an exit of the diffuser.

13 Claims, 9 Drawing Sheets

(56) References Cited

U.S. PATENT DOCUMENTS

| | | | |
|---|---|---|---|
| 11,059,018 | B2 | 7/2021 | Saretto et al. |
| 11,123,702 | B2 | 9/2021 | Saretto et al. |
| 11,273,423 | B2 | 3/2022 | Saretto et al. |
| 11,278,860 | B2 | 3/2022 | Saretto et al. |
| 2009/0266741 | A1 | 10/2009 | Duyvesteyn et al. |
| 2012/0020841 | A1 | 1/2012 | Bushuev |
| 2014/0243569 | A1 | 8/2014 | Seppala et al. |

OTHER PUBLICATIONS

PCT International Search Report and Written Opinion of International Searching Authority mailed Mar. 20, 2023 corresponding to PCT International Application No. PCT/US2022/038437 filed Jul. 27, 2022.

SUPERSONIC DIFFUSER FOR TURBOMACHINERY ARRANGED TO IMPART THERMAL ENERGY TO A PROCESS FLUID

BACKGROUND

Disclosed embodiments relate generally to the field of turbomachinery, and, more particularly, to turbomachinery arranged to impart thermal energy to a process fluid, such as for carrying out an endothermic process in connection with the process fluid, and, even more particularly, to supersonic diffusers adapted for use in such turbomachinery.

An endothermic process refers to a thermochemical process that involves addition of heat to the fluid to promote occurrence of endothermic reactions. The endothermic process may be used in connection with various industrial operations for fractioning or "cracking" of molecules that may be constituents of the process fluid. Thermal cracking may involve separation of chemical bonds of relatively complex molecular species to form simpler molecular species.

SUMMARY

In one aspect, a supersonic diffuser includes a vaned zone configured to define a passageway having a flow area to pass a flow of a process fluid at supersonic velocity. The vaned zone is configured to define a step-change to the flow area of the passageway. A shock zone is fluidly coupled to the vaned zone to pass the flow of the process fluid that exits the vaned zone. The shock zone is configured to support a system of shock waves that increases static temperature of the process fluid downstream of the system of shock waves. A mixing and subsonic diffusion zone is fluidly coupled to the shock zone. The mixing and subsonic diffusion zone, with the flow below unity Mach number, is configured to decelerate process fluid from the shock zone to a reduced subsonic speed prior to discharge of the process fluid through an exit of the supersonic diffuser.

The foregoing has broadly outlined some of the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
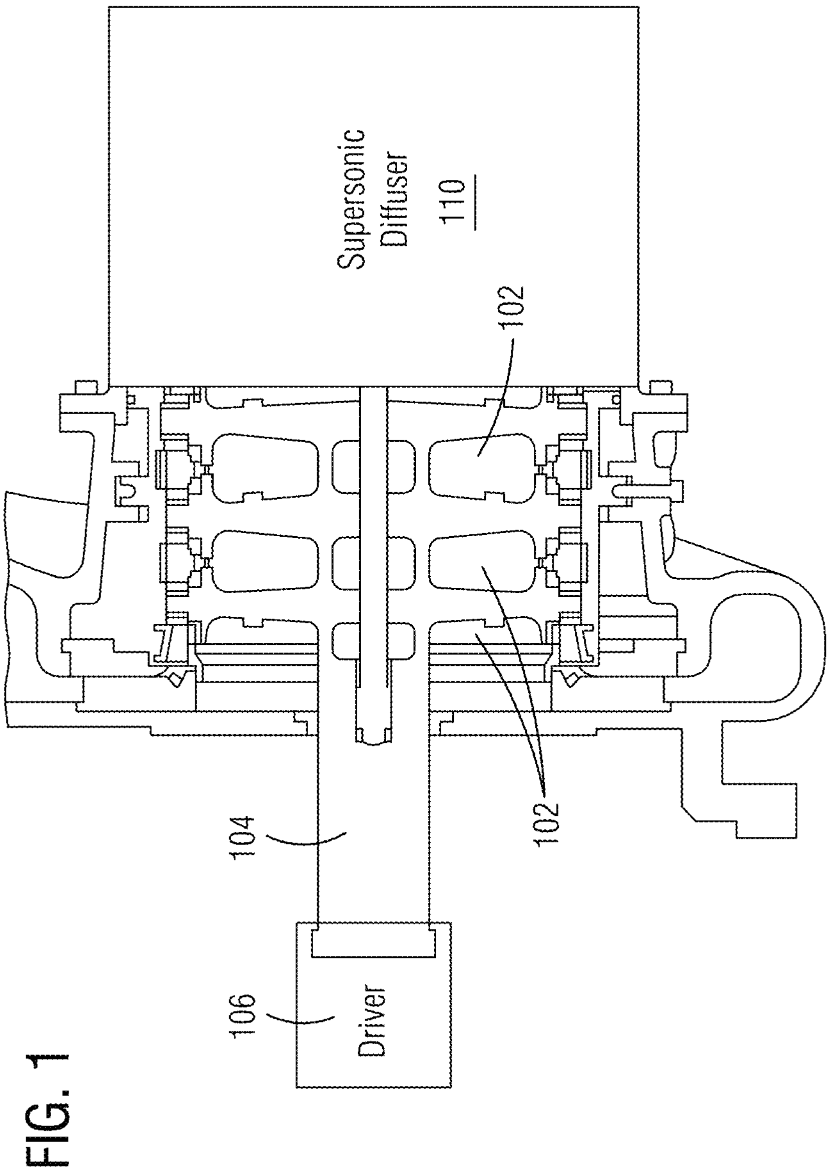
FIG. 1 is a schematic representation of one non-limiting embodiment of a turbomachine arranged to impart thermal energy to a process fluid.

Disclosed supersonic diffuser embodiments are effective to diffuse internal supersonic flows of elastic fluids, such as may be used in turbomachines arranged to impart thermal energy to a process fluid to carry out various industrial processes, such as may involve thermo-chemical reactions for fractioning or "cracking" relatively complex molecular species (e.g., precursor molecular species) into simpler molecular species that, for example, may have a relatively lower molecular weight than the precursor molecular species.

It will be appreciated that disclosed supersonic diffuser embodiments not just convert the kinetic energy of the fluid into internal energy, but also provide a shock zone where a desired increase of the static temperature of the fluid is achieved to initiate certain thermo-chemical reactions. Disclosed embodiments exhibit a robust and compact topology that can appropriately handle a broad range of back pressures while substantially isolating the upstream fluid flow regimes.

Before disclosed embodiments are explained in detail, it is to be understood that disclosed embodiments are not limited in applicability to the details of construction and the arrangement of components set forth in this description or illustrated in the following drawings. The underlying principles embodied in disclosed embodiments may be realized by way of further embodiments and of being practiced or of being carried out in various ways. Also, it is to be understood that the phraseology and terminology used herein is for the purpose of description and should not be regarded as limiting.

Various technologies that pertain to apparatuses and/or methodologies will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain elements may be performed by multiple elements. Similarly, for instance, an element may be configured to perform functionality that is described as being carried out by multiple elements. The numerous innovative teachings of the present application will be described with reference to exemplary non-limiting embodiments.

It should be understood that the words or phrases used herein should be construed broadly, unless expressly limited in some examples. For example, the terms “including,” “having,” and “comprising,” as well as derivatives thereof, mean inclusion without limitation. The singular forms “a”, “an” and “the” are intended to include the plural forms as well, unless the context clearly indicates otherwise. Further, the term “and/or” as used herein refers to and encompasses any and all possible combinations of one or more of the associated listed items. The term “or” is inclusive, meaning and/or, unless the context clearly indicates otherwise. The phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms “first”, “second”, “third” and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term “adjacent to” may mean that an element is relatively near to but not in contact with a further element or that the element is in contact with a further portion, unless the context clearly indicates otherwise. Further, the phrase “based on” is intended to mean “based, at least in part, on” unless explicitly stated otherwise. Terms “about” or “substantially” or like terms are intended to cover variations in a value that are within normal industry manufacturing tolerances for that dimension. If no industry standard is available, a variation of twenty percent would fall within the meaning of these terms unless otherwise stated.

FIG. 1 is a schematic representation of one non-limiting embodiment of a turbomachine 100 arranged to impart thermal energy to a process fluid. As shown in FIG. 1, a number of rows of rotatable blades 102 are coupled to a rotor shaft 104 that in turn is coupled to and driven by a shaft-rotating power source or driver 106, such as an electric motor, steam or gas turbine, or another turbomachine.

The rows of rotatable blades 102 impart kinetic energy to the process fluid through a well-understood momentum transfer process. In FIG. 1, there are three rows of rotatable blades 102 for adding kinetic energy to the process fluid. It will be appreciated that the number of rows of rotatable blades shown in FIG. 1 should be construed as an example and not as a limitation since such number can be adapted based on the needs of any given application. The process fluid is then fluidly coupled to be processed by a supersonic diffuser 110 to decelerate the flow and convert kinetic energy in the process fluid into thermal energy, as described in greater detail below.

Figure 2:
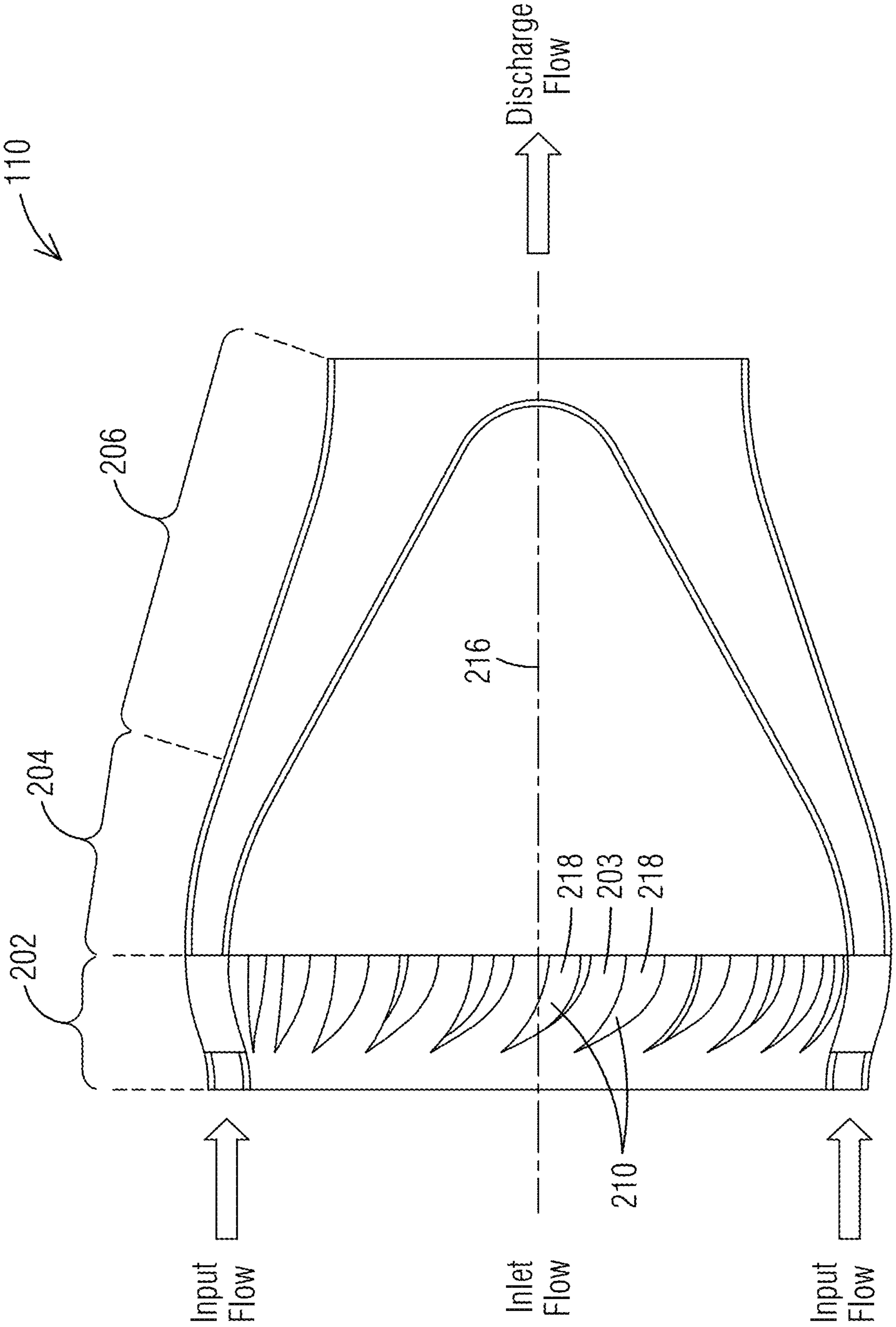
FIG. 2 is a fragmentary cut away view of one non-limiting embodiment of a disclosed supersonic diffuser that may form part of a turbomachine, such as the turbomachine illustrated in FIG. 1.

FIG. 2 is a fragmentary cut away view of one non-limiting embodiment of supersonic diffuser 110 fluidly coupled to receive process fluid flow exiting from the most downstream row of rotatable blades 102 (FIG. 1). Supersonic diffuser 110 includes a vaned zone 202, a shock zone 204 and a mixing and subsonic diffusion zone 206. Vaned zone 202 is configured to define a passageway 203 having a flow area to pass the flow of the process fluid at supersonic velocity. In this embodiment, vaned zone 202 is configured to define a step-change to the flow area of the passageway at a location where the flow of the process fluid exits the vaned zone. It will be understood that vaned zone 202 is formed by a series of circumferentially arranged individual flow passageways 203 leading to the shock zone 204. That is, shock zone 204 is located downstream from vaned zone 202. To avoid unnecessary visual cluttering, just one of such passageways 203 is pointed to in the figures since the structural and/or operational relationships would be the same for each passageway 203.

Regardless of the specific implementation, the step-change provides a sudden increase to the flow area at a given location and leads to a formation of a system of shock waves into shock zone 204 that in turn increases the static temperature of the process fluid, as elaborated in greater detail below. That is, the step-change to the flow area of each passageway constitutes a specific, discontinuous change in flow area at the interface between vaned zone 203 and shock zone 204 to initiate the shock wave system. In general, the transition between vaned zone 203 and shock zone 204 is defined by the step-change to the flow area and then shock zone 204 may or may not continue with defined passages.

In one example embodiment, as can be appreciated in FIG. 2, vaned zone 202 includes a pair of spaced apart vanes 210 interposed between an outer wall 212 and an inner wall 214 of the supersonic diffuser. In this embodiment, the pair of vanes 210 is configured to turn a flow direction of the process fluid to be parallel or approximately parallel along an axial direction of supersonic diffuser 110, schematically represented by center line 216. The pair of vanes 210 each has a blunt trailing edge 218 (e.g., truncated trailing edge) that circumferentially defines the step-change to the flow area of passageway 203. Once again, to avoid unnecessary visual cluttering, just one of such pairs of spaced apart vanes 210 is pointed to in the figures since the structural and/or operational relationships would be the same for each pair of spaced apart vanes 210. In one embodiment, the location of the step-change may be conceptualized to be at the intersection of vaned zone 202 and the shock zone 204.

Figure 3:
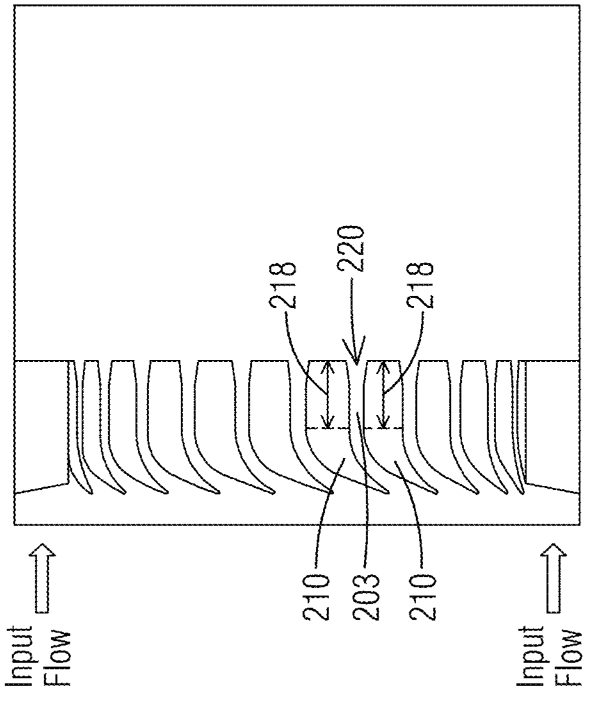
FIG. 3 is a fragmentary cut away view of another non-limiting embodiment of a disclosed supersonic diffuser.

It will be appreciated that in these embodiments (FIG. 2; FIG. 3)) vaned zone 202 is formed by a plurality of circumferentially positioned vane pairs 210 that collectively span 360 degrees of the annulus defined by outer wall 212 and inner wall 214, where each vane pair 210 defines a respective passageway 203 for a respective stream or jet of the process fluid. That is, the plurality of circumferentially positioned vane pairs 210 collectively define the series of circumferentially arranged individual flow passageways 203 leading to the shock zone 204.

Figure 4:
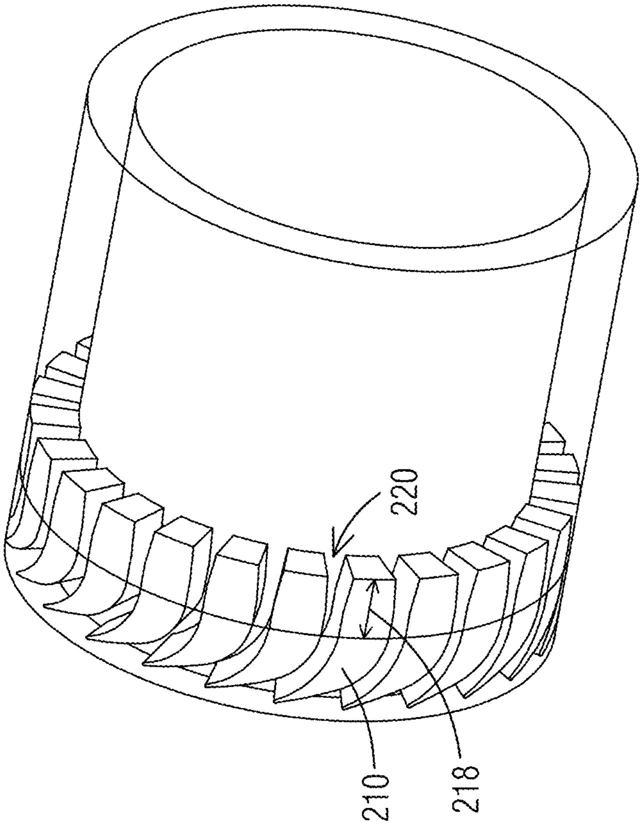
FIG. 4 is an isometric view of the embodiment illustrated in FIG. 3.

In another embodiment, as shown in FIG. 3 and FIG. 4, each vane pair 210 may include an axial extension (schematically represented by twin-headed arrow 218) featuring a tapering section 220 that allows some area expansion in the passageway 203 before the process fluid exits the vaned zone. Depending on the needs of a given application, this embodiment permits greater tolerance to backpressure variation that may be encountered in the given application. In this example, the total increase in the flow area may be up to approximately 200%.

Figure 9:
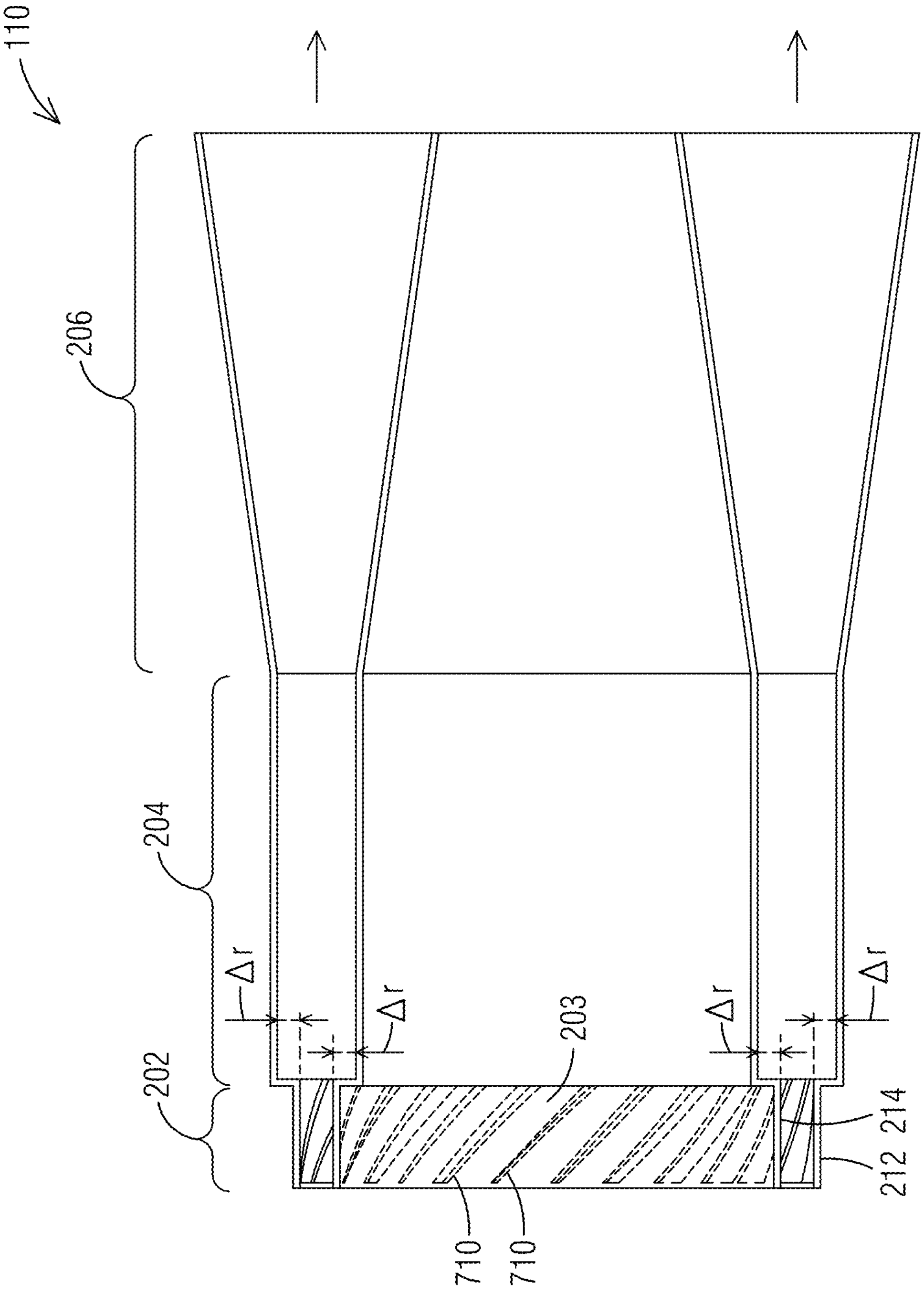
FIG. 9 is a fragmentary cut away view of still another non-limiting embodiment of a disclosed supersonic diffuser that may form part of a turbomachine.
Figure 10:
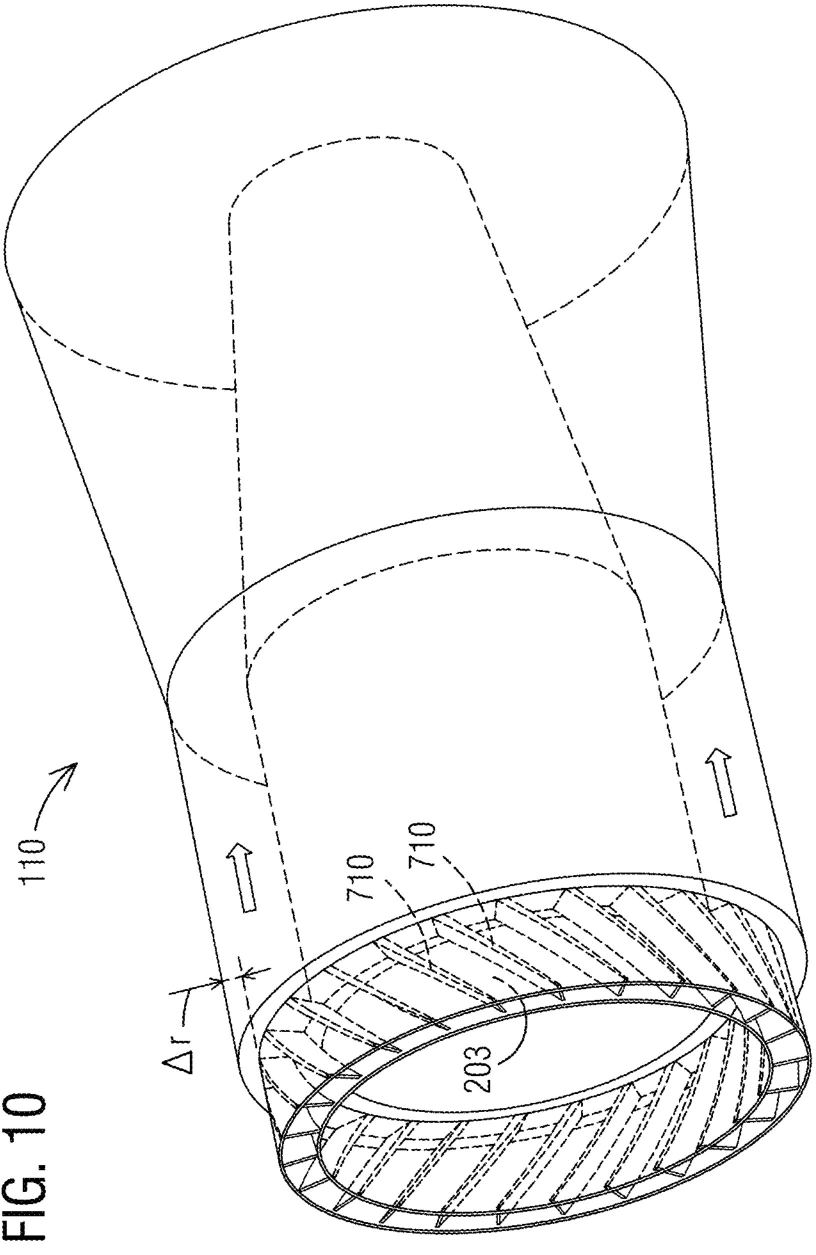
FIG. 10 is an isometric view of the embodiment illustrated in FIG. 9.

In another embodiment, as shown in FIG. 9 and FIG. 10, vaned zone 202 includes a pair of low camber vanes 710. Each respective vane of the pair of low camber vanes 710, by way of example, may have a camber angle of approximately 20 degrees or less. The pair of low camber vanes 710 is interposed between outer wall 212 and inner wall 214 of the supersonic diffuser. The pair of low camber vanes 710 is arranged to guide the flow of the process fluid to meet the step-change to the flow area of passageway 203. In this embodiment, at least one of outer wall 212 and inner wall 214 has a step-change in radius (labelled Δr) that radially defines the step-change to the flow area of passageway 203.

In this embodiment, as noted above, vaned zone 202 is formed by a plurality of circumferentially positioned low camber vane pairs 710 that collectively span 360 degrees of the annulus defined by outer wall 212 and an inner wall 214, where each low camber vane pair 710 defines a respective passageway for a respective stream or jet of the process fluid. That is, the plurality of circumferentially positioned low camber vane pairs 710 collectively defines the series of circumferentially arranged individual flow passageways 203 leading to the shock zone 204. For simplicity of description and explanation structural and/or operational relationships of the plurality of circumferentially positioned low camber vanes 710 are described just for one of such low camber vane pairs 710 since such structural and/or operational relationships would be the same for each respective pair of low camber vanes 710.

It will be appreciated that the embodiments described above in the context of FIG. 2, and FIGS. 9 and 10, may be combined with one another. That is, the step-change to the flow area of the passageway may be implemented by way of a combination of blunt trailing edges 218 of vane pairs 210 (FIG. 2) and the step-change in radius (Δr), as discussed in the context of FIGS. 9 and 10.

Regardless of the specific implementation for implementing the step-change to the flow area, by way of example, the step-change may be configured to provide an increase to the flow area in a range from approximately 30% to approximately 200% at the location where the step-change is located.

Figure 5:
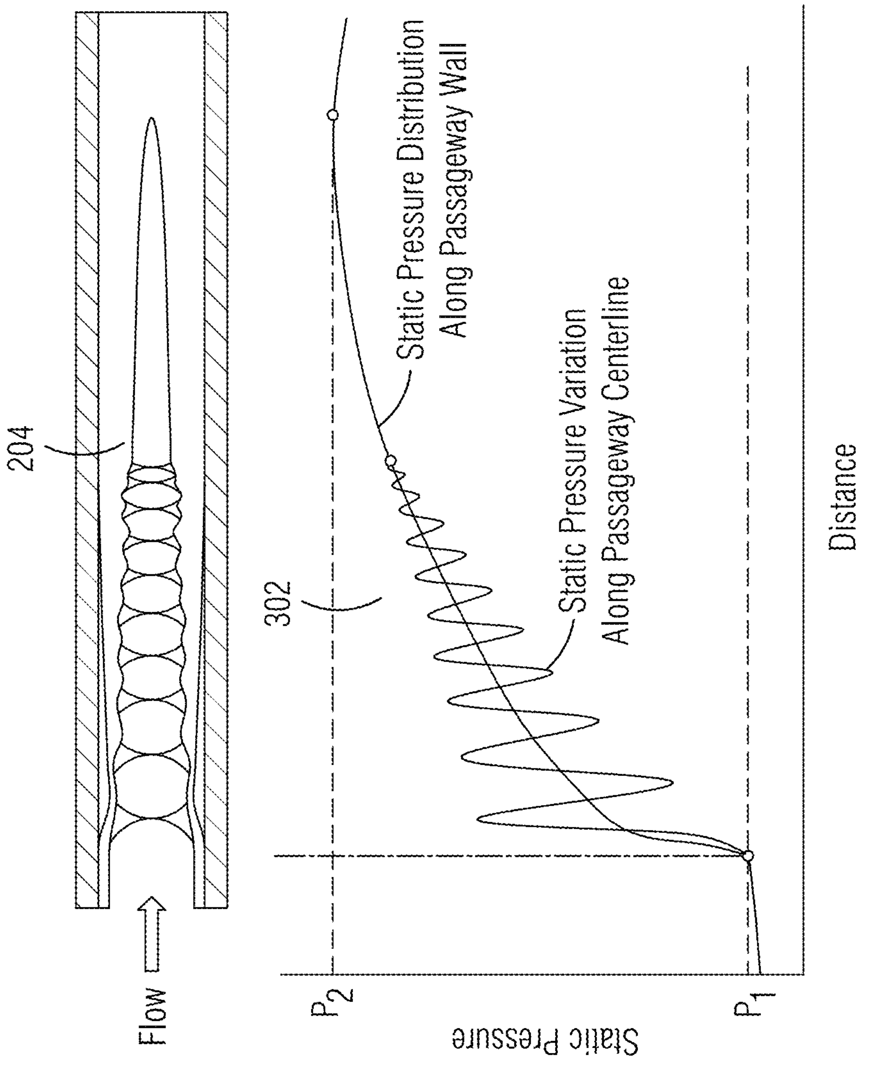
FIG. 5 shows respective example plots for conceptualizing a shock zone in a disclosed supersonic diffuser, where the shock zone is configured to support a system of shock waves that increases the static temperature of the process fluid.

FIG. 5 shows respective example plots for conceptualizing a system of shock waves 302 that may be formed in shock zone 204 that may be part of a disclosed supersonic diffuser, where the system of shock waves 302 permits to increase the static temperature of the process fluid downstream of the system of shock waves. As can appreciated in FIG. 5, in one example embodiment, a respective intensity of successive shock waves in the system of shock waves 302 becomes progressively attenuated as the system of shock waves propagates in shock zone 204. For readers desirous of further background information in connection with the behavior of shock wave systems, "reference is made to paper titled "Flow Establishment of Precombustion Shock Trains in a Shock Tunnel" by Andrew N. Ridings and Michael K. Smart, published by the American Institute of Aeronautics, 2017.

Figure 8:
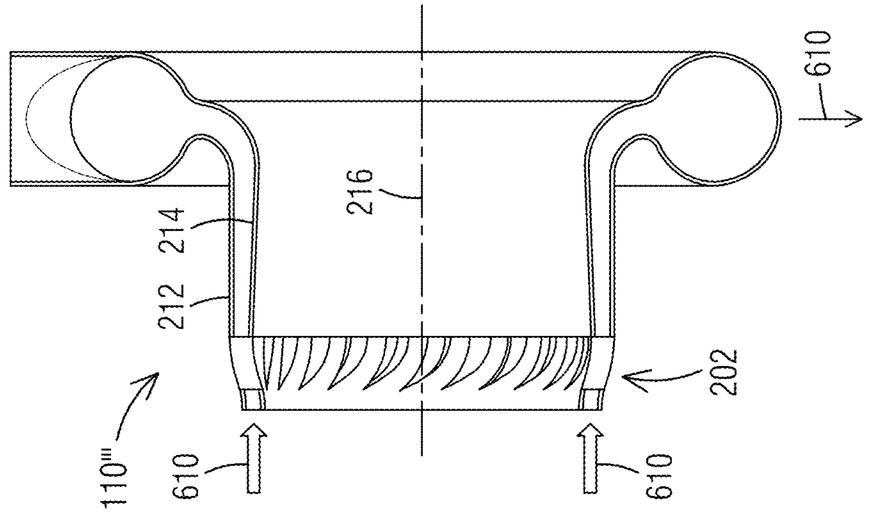
FIG. 6 through FIG. 8 each is a fragmentary cut away view of further non-limiting embodiments of disclosed supersonic diffusers.
Figure 7:
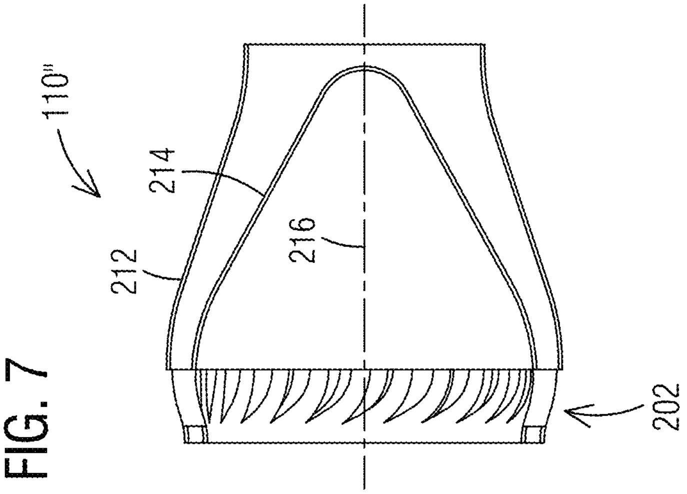
Figure 6:
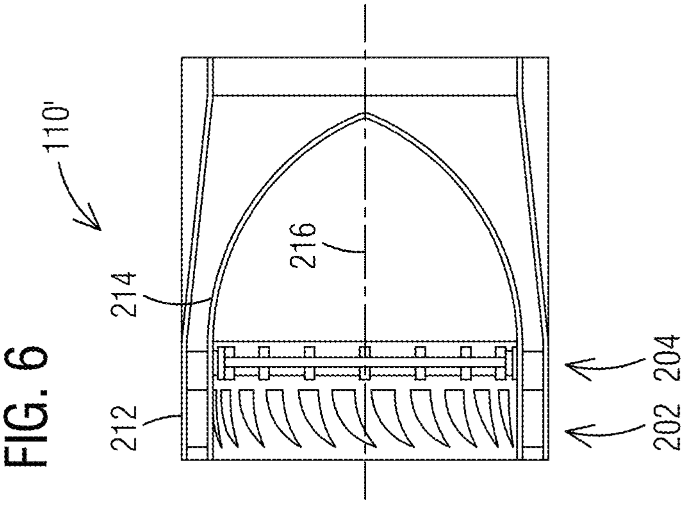

FIG. 6 through FIG. 8 each is a cross-sectional view of further non-limiting example embodiments of disclosed supersonic diffusers 110', 110" and 110'". By way of example, supersonic diffuser 110' has outer wall 212 and inner wall 214 parallel or approximately parallel with center line 216 through vaned zone 202. By way of example, shock zone 204 may be configured to turn several degrees (e.g., up to approximately 10 to 15 degrees) toward the centerline with an approximately constant area (e.g., height increasing) for the respective passageways for the process fluid.

By way of comparison, supersonic diffusers 110 (FIG. 2), 110" and 110'" each can have appropriately contoured walls 212, 214 to inhibit the effects of curvature that may be present in the annular passages defined by such walls. It will be appreciated that supersonic diffusers 110 (FIG. 2), 110', 110" each is configured to provide discharge of the process fluid along an axial direction, (e.g., co-axial pipe discharge). By way of example, supersonic diffuser 110'" is configured to provide discharge of the process along a radial direction after turning the flow from an initial axial direction, as schematically represented by arrows 610.

Without limitation, a meridional area distribution in one embodiment of a supersonic diffuser may be configured to account for boundary layer growth and increase the meridional area distribution by approximately 5% to approximately 15% through vaned zone 202. In the mixing and subsonic diffusion zone 206, in certain embodiments a net divergence of the passageway with an equivalent half angle of up to approximately 8 degrees may allow to efficiently realize total pressure recovery in the diffuser. In one example embodiment, a hub to tip radius of a respective vane in vaned zone 202 may be in a range from approximately 0.80 to approximately 0.95, and pitch spacing to axial chord may be between approximately 0.8 and approximately 1.0. In one example embodiment, a length of shock zone 204 may have a range from approximately eight times to approximately ten times a hydraulic diameter of the passageway defined by the vaned zone at the location where, for example, the flow of the process fluid exits the vaned zone.

Figure 12:
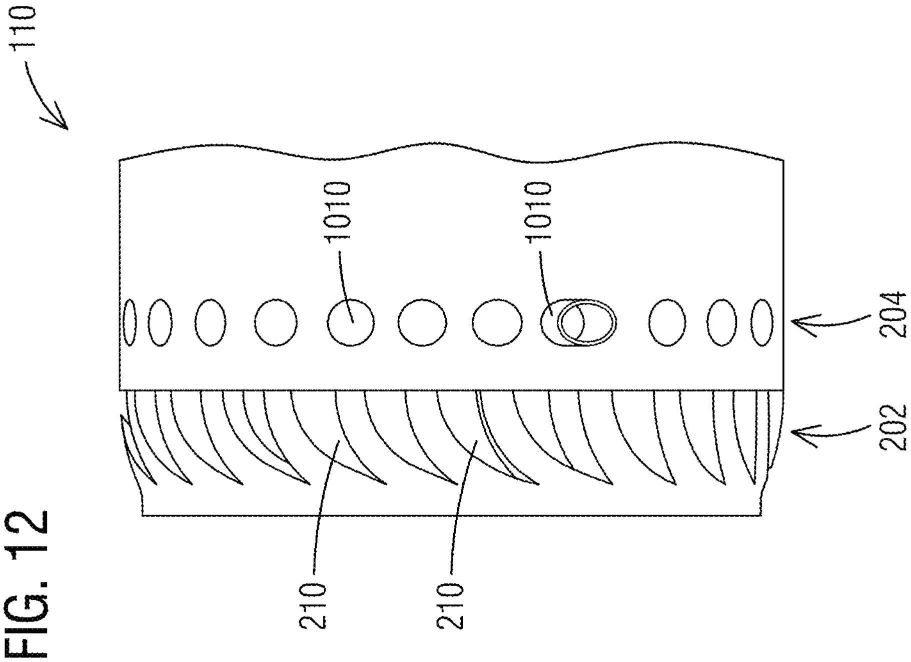
FIG. 11 and FIG. 12 are respective fragmentary cut-away views of further embodiments of disclosed supersonic diffusers that may involve respective shock attenuation structures.
Figure 11:
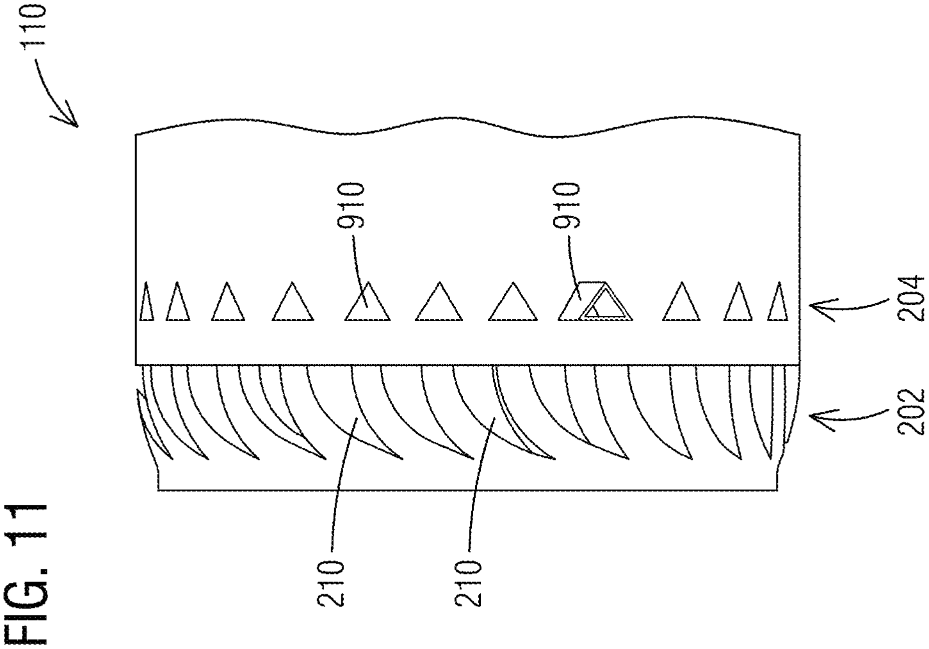

FIG. 11 and FIG. 12 are respective fragmentary cut-away views of further embodiments of disclosed supersonic diffusers that may involve respective shock attenuation structures located in the shock zone 204 proximate the exit of the vaned zone 202. For example, supersonic diffuser 110, as shown in FIG. 11, includes an array of prismatic triangular shock attenuation structures 910. These shock attenuation structures 910 may protrude in a radial direction across the flow path downstream from and aligned with the exit of the passages of the vaned zone 202. Although FIG. 11 and FIG. 12 illustrate the vaned zone topology discussed in the context of FIG. 2, it will be appreciated that the shock attenuation structures may be optionally used in any other of the foregoing embodiments of the disclosed supersonic diffusers.

In another example embodiment, supersonic diffuser 110, as shown in FIG. 12, includes an array of circular-shaped shock attenuation structures 1010. If optionally desired, arrays 910, 1010, may include multiple rows of shock attenuation structures spaced along the axial direction to further enhance the diffuser performance with respect to rapidly and uniformly converting the fluid's supersonic velocity into internal energy.

In one example embodiment, the process fluid subjected to the thermochemical reaction may comprise ammonia to produce a mixture of ammonia and hydrogen. As would be appreciated by one skilled in the art, the mixture of ammonia and hydrogen constitutes a carbon-free fuel. In another example embodiment, the process fluid subjected to the thermochemical reaction may comprise saturated hydrocarbons, such as propane, naphtha, or ethane to produce olefins.

In one example embodiment, the train of shock waves is effective to raise the static temperature of the process fluid downstream of the train of shock waves by at least ten percent (10%), within ten milliseconds (10 MS), without changing static pressure by more than plus or minus 25 percent (25%).

Figure 13:
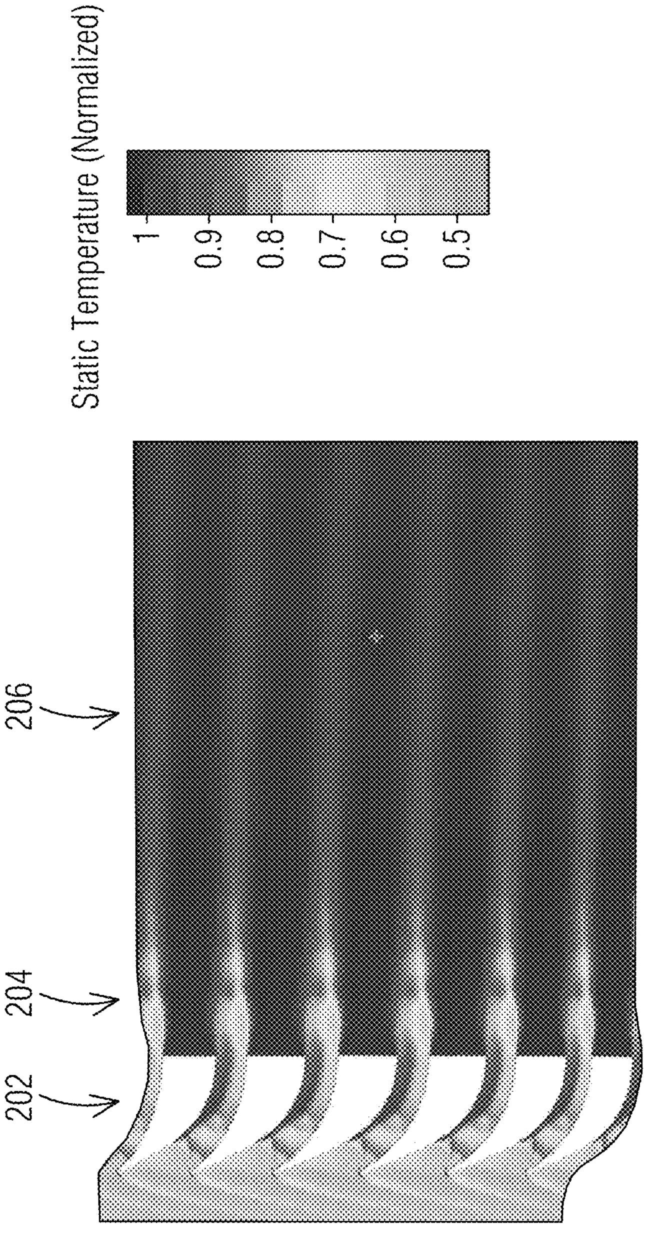
FIG. 13 is a plot obtained from an example model of a disclosed supersonic diffuser. The plot shows spatial distribution of static temperature in a process fluid that initially flows at supersonic velocity from a vaned zone of the diffuser to the shock zone and eventually to a mixing and subsonic diffusion zone of the diffuser.

FIG. 13 is a plot obtained from an example model of a disclosed supersonic diffuser. The plot shows spatial distribution of static temperature in a process fluid that initially flows at supersonic velocity from the vaned zone 202 of the diffuser to the shock zone 204 and eventually to the mixing and subsonic diffusion zone 206 of the diffuser.

In operation, disclosed supersonic diffuser embodiments are effective to realize a desired increase of the static temperature of the fluid to initiate certain thermo-chemical reactions. Disclosed embodiments exhibit a robust and compact topology that can handle a broad range of back pressures while isolating the upstream fluid flow regimes.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope. The scope of patented subject matter is defined only by the allowed claims. Moreover, none of these claims are intended to invoke a means plus function claim construction unless the exact words "means for" are followed by a participle.

What is claimed is:

1. A supersonic diffuser comprising:

a vaned zone configured to define a passageway having a flow area to pass a flow of a process fluid at supersonic velocity, the vaned zone configured to define a step-change to the flow area of the passageway;

a shock zone fluidly coupled to the vaned zone to pass the flow of the process fluid that exits the vaned zone, the shock zone configured to support a system of shock waves that increases static temperature of the process fluid downstream of the system of shock waves; and a mixing and subsonic diffusion zone fluidly coupled to the shock zone, the mixing and subsonic diffusion zone, with the flow at a Mach number of less than one, configured to decelerate the process fluid from the shock zone to a reduced subsonic speed prior to discharge of the process fluid through an exit of the supersonic diffuser, wherein the step-change provides a sudden increase to the flow area and the step-change to the flow area of the passageway constitutes a discontinuous change in flow area at the interface between the vaned zone and the shock zone to initiate the system of shock waves, wherein the vaned zone comprises a pair of spaced apart vanes interposed between an outer wall and an inner wall of the supersonic diffuser, wherein the pair of spaced apart vanes is configured to turn a flow direction of the process fluid to be parallel along an axial direction, wherein at least one of the outer wall and the inner wall has a step-change in radius that radially further defines the step-change to the flow area of the passageway, and wherein the step-change to the flow area of the passageway is at a location where the flow of the process fluid exits the vaned zone.

2. The supersonic diffuser of claim 1, wherein the pair of spaced apart vanes each has a blunt trailing edge that circumferentially defines the step-change to the flow area of the passageway.

3. The supersonic diffuser of claim 1, wherein the pair of spaced apart vanes comprises a pair of low-camber vanes, each low-camber vane having a camber angle of 20 degrees or less and being arranged to guide the flow of the process fluid to encounter the step-change to the flow area of the passageway.

4. The supersonic diffuser of claim 1, wherein the location of the step-change to the flow area is at an intersection of the vaned zone and the shock zone.

5. The supersonic diffuser of claim 1, wherein the shock zone has a constant flow area.

6. The supersonic diffuser of claim 1, wherein a length of the shock zone is in a range from eight times to ten times a hydraulic diameter of the passageway defined by the vaned zone at the location where the flow of the process fluid exits the vaned zone.

7. The supersonic diffuser of claim 1, wherein the mixing and subsonic diffusion zone is configured to provide discharge of the process fluid along one of the following: an axial direction, a radial direction or along a direction including both axial and radial components.

8. The supersonic diffuser of claim 1, wherein a hub to tip radius of a respective vane in the vaned zone is in a range from 0.80 to 0.95, and wherein a pitch spacing to axial chord of the respective vane is in a range from 0.8 to 1.0.

9. The supersonic diffuser of claim 1, wherein the passageway is one of a series of circumferentially arranged individual passageways fluidly coupled to the shock zone.

10. The supersonic diffuser of claim 9, wherein the pair of spaced apart vanes is one pair of a plurality of circumferentially positioned vane pairs that collectively define the series of circumferentially arranged passageways fluidly coupled to the shock zone.

11. The supersonic diffuser of claim 3, wherein the passageway is one of a series of circumferentially arranged individual passageways fluidly coupled to the shock zone.

12. The supersonic diffuser of claim 11, wherein the pair of low-camber vanes is one pair of a plurality of circumferentially positioned low-camber vane pairs that collectively define the series of circumferentially arranged passageways fluidly coupled to the shock zone.

13. A turbomachine operable to impart thermal energy comprising the supersonic diffuser of claim 1.

* * * * *